US009374630B1

(12) United States Patent
Nijim et al.

(10) Patent No.: US 9,374,630 B1
(45) Date of Patent: Jun. 21, 2016

(54) LINKING ADDITIONAL CONTENT TO A BEING-CONSUMED VIDEO CONTENT ITEM

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US); Eric S. Roberts, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/294,866

(22) Filed: Jun. 3, 2014

(51) Int. Cl.
*H04N 7/10* (2006.01)
*H04N 7/025* (2006.01)
*H04N 21/858* (2011.01)
*H04N 21/235* (2011.01)
*H04N 21/2668* (2011.01)
*H04N 21/431* (2011.01)
*H04N 21/435* (2011.01)
*H04N 21/4722* (2011.01)

(52) U.S. Cl.
CPC ....... *H04N 21/8586* (2013.01); *H04N 21/2353* (2013.01); *H04N 21/2668* (2013.01); *H04N 21/431* (2013.01); *H04N 21/435* (2013.01); *H04N 21/4316* (2013.01); *H04N 21/4722* (2013.01)

(58) Field of Classification Search
CPC .......... H04N 21/8586; H04N 21/2353; H04N 21/2668; H04N 21/4316; H04N 21/435; H04N 21/431; H04N 21/4722
See application file for complete search history.

(56) References Cited

U.S. PATENT DOCUMENTS

| 6,668,278 | B1 | 12/2003 | Yen et al. | |
|---|---|---|---|---|
| 2001/0001160 | A1 | 5/2001 | Shoff et al. | |
| 2002/0120935 | A1 | 8/2002 | Huber et al. | |
| 2007/0234213 | A1 | 10/2007 | Krikorian et al. | |
| 2007/0294721 | A1 | 12/2007 | Haeuser et al. | |
| 2010/0077428 | A1* | 3/2010 | Arnold et al. | 725/34 |
| 2011/0173668 | A1 | 7/2011 | Rooks | |

OTHER PUBLICATIONS

Introduction: HbbTV, 1 page (Copyright 2013).
Oskar van Deventer, M. et al., "HBB-NEXT: Tailoring and Synchronising HbbTV with Multiple Second Screens," IP&TV World Forum, 20 pages (Mar. 21, 2012).

(Continued)

*Primary Examiner* — Oschta Montoya
(74) *Attorney, Agent, or Firm* — Merchant & Gould

(57) ABSTRACT

Links are provided in association with video content that reference and allow navigation to additional content related to the video content. Links may be embedded in the video content metadata or sent separately and synchronized with the video content via time stamps. Selection of the links allows a user to view the additional content or to view the video content item along with the additional content to provide a richer and deeper personalized viewing experience. The video content may be analyzed to determine whether additional content may be available. If additional content is identified, the video content item may include the additional content or the video content may receive links to the additional content. Additional content that is relevant to the user based on the user's viewing history, viewing patterns, viewing behavior, demographic profile, etc. may be identified for association with a given video content item.

19 Claims, 9 Drawing Sheets

(56) References Cited

OTHER PUBLICATIONS

Press Release, "HbbTV Consortium Ramps up Worldwide Activity," HbbTV Consortium, 2 pages (Jun. 25, 2013).
U.S. Non-Final Office Action for U.S. Appl. No. 14/031,004 mailed May 6, 2015.
U.S. Final Office Action for U.S. Appl. No. 14/031,004 mailed Sep. 14, 2015.
U.S. Appl. No. 14/031,004, filed Sep. 18, 2013 entitled "Dynamic URL Insertion in the Video Stream and Companion Applications".
U.S. Non-Final Office Action for U.S. Appl. No. 14/031,004 mailed Feb. 1, 2016.

* cited by examiner

LINKING ADDITIONAL CONTENT TO A BEING-CONSUMED VIDEO CONTENT ITEM

BACKGROUND

Video consumers today have embraced interactive television (TV) which offers a completely unique and enjoyable experience. A growing number of consumers choose to view content via streaming alternatives because they like more control over the video content. In addition, the way people use devices to access content is changing as "multi-screening," or the use of multiple screens simultaneously has become a normal operating mode for many consumers. Consumers are frequently using a second device in some capacity while watching television. This media multitasking may be great for consumers, but with people dividing their attention between screens, the pressure may be increased for advertisers, content creators, content providers etc., to create compelling and/or engaging viewing experiences that span devices and content delivery systems. Additionally, in-stream advertising holds the potential to tell advertisers whether viewers watched a given advertisement, whether they followed through on embedded calls-to-action, and so forth. Accordingly, the viewer's behavior may require taking a holistic approach to the content strategy by adjusting advertising strategies to fit the consumer's multi-screen behavior and the context of how consumers use each device.

Currently, additional interactive content may be included with some video content that is provided by the content owners/providers. Unfortunately, the additional content may often be very generic, minimally personalized and/or merely based on the being-consumed content. However, service providers may have more data on the user/viewer which may allow service providers to personalize the additional content more efficiently.

It is with respect to these and other considerations that the present invention has been made.

SUMMARY

Embodiments of the present invention provide content additional to being-consumed video content by changing or creating/adding links or uniform resource locators (URLs) to additional content in association with the being-consumed content which allows a user to view the additional content or to view a video content item along with the additional content for providing a richer and deeper personalized viewing experience and for giving more control to the user during the viewing experience. Links or URLs may be embedded in the content metadata, or may be sent separately and synchronized with the video stream.

For example, if a user is viewing a television video content presentation, such as a presentation provided by CNN, there may be other new additional content on the CNN website or the user's social networks that may be of interest to the user. There may also be advertisements that may be related to the content that the user is viewing. For example, if the user is viewing news about an event that happened in New York, there may be advertisements related to tourism, events, products and services associated with New York that may be available as additional content that may be provided to the user.

According to one embodiment, being-consumed content may be analyzed to determine whether additional content may be available. If additional content is identified, a link or URL for the additional content may be created and associated with the being-consumed content or an existing link or URL associated with the being-consumed content may be modified.

Further, the additional content linked or referenced to the being-consumed content may be static, such as a webpage or previously generated advertisement, or the additional content may be dynamic wherein a user may be directed to additional content being developed and presented in real time based on various factors. For dynamic additional content, a service provider may update links (e.g., URLs) based on various factors such as a user's viewing history, a user's viewing behavior, viewing patterns, a user's profile, user demographic information, a user's social networks, and the current content being viewed. Further, the dynamic additional content may be updated based on one or more factors, such as time of day, additional interactive content, business rules/agreements or actions by the user or service provider, etc.

Accordingly, these options may create more value for the owners/providers of the additional content and may prove more benefit for the user by further enhancing the user's viewing experience and by providing targeted content to the user.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
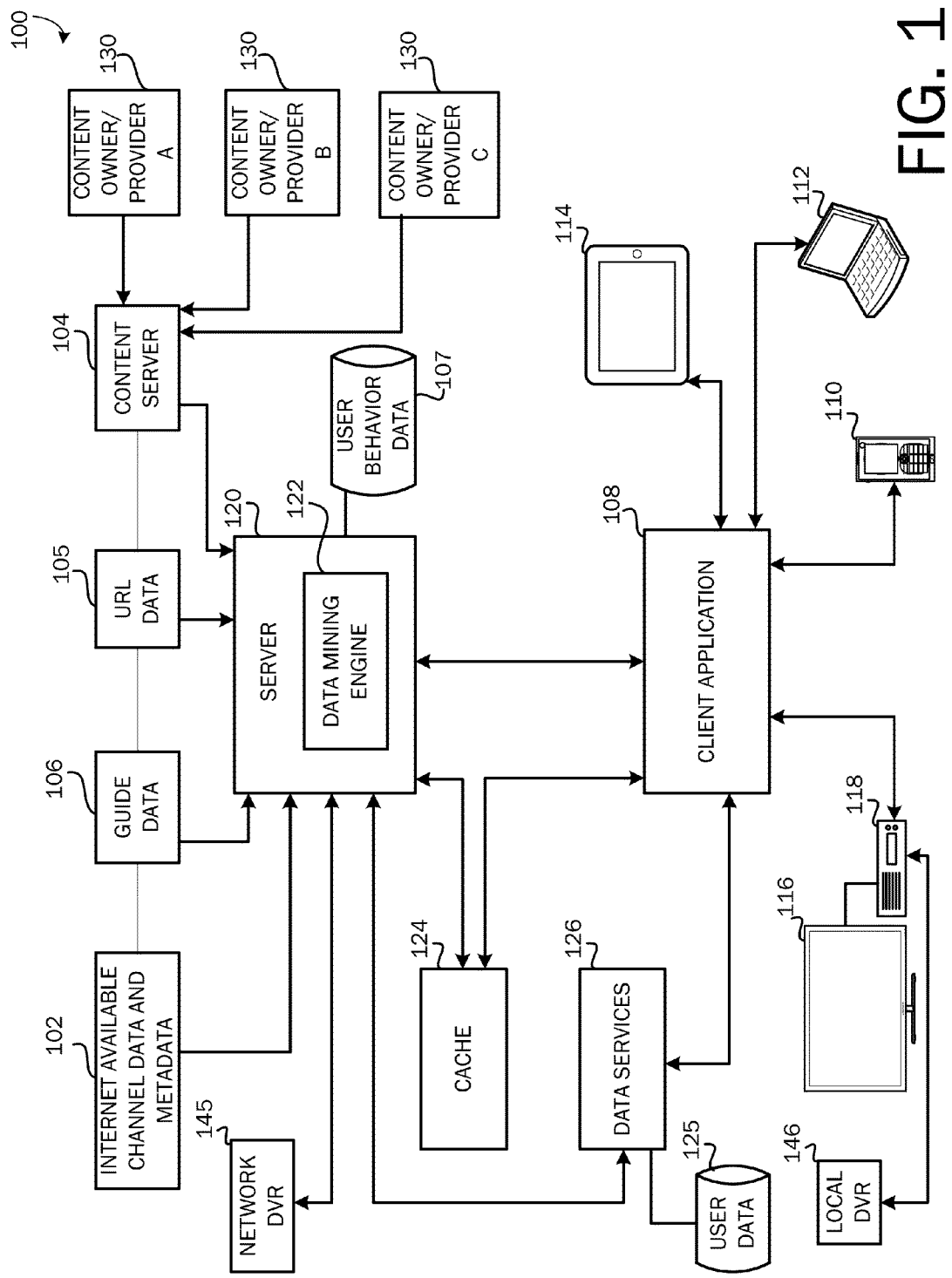
FIG. 1 is a block diagram of a system for providing editing and changing of links associated with being-consumed content in real time.

As briefly described above, embodiments of the present invention provide content additional to being-consumed video content by changing or creating/adding links or uniform resource locators (URLs) to additional content in association with the being-consumed content which allows a user to view the additional content or to view a video content item along with the additional content for providing a richer and deeper personalized viewing experience and for giving more control to the user during the viewing experience. The links or URLs may be embedded in the content metadata, or may be sent separately and synchronized with the video stream. A content service provider may provide additional content that is relevant to the user based on the user's viewing history, viewing patterns, viewing behavior, demographic profiles, etc. Further, many factors may trigger the updating of the additional content. These embodiments may be combined, other embodiments may be utilized, and structural changes may be made without departing from the spirit or scope of the present invention.

According to embodiments, video content service providers may change or create links or URLs in association with the being-consumed content or available-for-consumption content (e.g., television shows, movies, etc.) after the content is being received by the content owner (e.g., content consumer). The embodiments may apply to all types of content such as linear, live, nonlinear, or web video streams. Embodiments may provide for the association of the links/URLs to be performed via a variety of mechanisms. In one embodiment, the links/URLs may be embedded in the metadata of the being-consumed content. In another embodiment, the links/URLs may be sent separately and synchronized with the video stream via time-stamps.

The links or URLs may be created and associated with a given content item (e.g., television show), or currently associated links or URLs may be modified. Although a content item may be encrypted, on playback of the content item, the new or modified link or URL may be dynamically inserted in the metadata. The link or URL in the metadata may allow consumers to view content via a linked or referenced website, or may cause the linked or referenced content to be played in a viewing window in proximity to or overlying the currently being-consumed content, the link or URL may trigger targeted advertising per device or user. The added or updated link or URL may contain different information than a previous link or URL or may enhance the viewing experience while keeping the older link. The change may be dynamic and in real time. This will affect all types of content.

For example, if a consumer is watching program1 on channel X and the program is national in scope, then a URL or link, associated with the program, may be different than a URL or link for program2 that is local. For example, an advertising link added in association with program1 may be significantly different for a national audience than an advertisement link added in association with program2 for a local audience. According to embodiments, the service provider may change the URLs or links in program2 on the fly on the device or in the server as needed based on factors associated with the local audience. The link could be triggered if the customer is watching the content or triggered by time slot on an associated viewing guide or any other triggering information. Once the trigger is enabled, then the new URL or link will be associated with the program. Additionally, the link or URL through the program itself may be adjusted based on the viewing experience of the user. The service provider may perform the URL or link insertion or modification after the received trigger or if the service provider decides to change the URL or link based on one or more factors or business rules (e.g., certain advertisements only to be provided during certain time slots).

The links or URLs added in association with the content may be changed or modified based on where the consumer is accessing the information. For example, if the consumer is viewing the content via a television viewing guide and attempts to access the link from the viewing guide, the service provider may insert a link that is different from a link that the consumer may receive if the content is being-consumed through channel tuning. Each channel or program that contains the link or URL may be displayed with an icon or other identifying item and the icon may be dynamically shown with different attributes or deleted based on the link or URL information sent by the service provider. Content that is national versus local may be distinguished wherein a link or URL may be changed or modified based on the desired experience by the service provider. The change or modification may be per program, channel, or different scenes within a channel or program.

According to embodiments, the links/URLs may be correlated with content/program metadata providers as received by the service provider. The links/URLs may be related to the program metadata collected by the service provider. For example, based on program 1 title, cast, time of showing, etc., the service provider may create a link/URL based on the collected information and the link/URL may be inserted based on the collected metadata.

Referring now to the drawings, in which like numerals refer to like elements throughout the several figures, embodiments of the present invention and an exemplary operating environment will be described. FIG. 1 is a block diagram of a system 100 for providing links/URLs (hereinafter referred to as links or URLs interchangeably) to additional content, as described above. Components of the system 100 may operate as a distributed system where each component is accessed via a suitable network, or the components may operate together as an integrated system. As illustrated, Internet-available channel data and metadata 102, content server 104, guide data 106 and URL data 105 may be provided. For example, Internet-available channel data and metadata 102 may include video content data and metadata available on the Internet, such as YouTube®, Hulu®, etc. Content server 104 may include video content data and metadata available via a service provider, such as cable television (CATV) services system (as illustrated and described below with reference to FIG. 6), satellite television provider, etc. The data and metadata may include information such as video content title, storyline, cast, genre, rating, release date, images, etc. Guide data 106 may include channel information, programming information, network information, etc. URL data 105 may include interactive content or pointers to the interactive content on the internet associated with the content provided by the content owners/providers A, B or C 130. Updating the additional interactive content associated with the video content items may be based on time, which may be triggered at a specific point of time in the video content, based on content, additional content available, based on user behavior (e.g., the manner in which the user consumes the video content and the additional content or video content being played) and/or may be based on action when the user switches to a particular video content, or other actions, for example, playing, rewinding, pausing, stopping, and hovering with respect to the video content item, etc.

Local DVR 146 and Network DVR 145 may also be provided, which may store DVR recording locally while recording from a TV 116 connected to a set-top box 118, or may store the DVR recordings on an IP network when recording from an IP enabled devices 110,112,114 respectively. When a user records a video content item on the local or the network DVR, the video content item may be recorded with the associated additional content. In accordance with one embodiment, when the user decides to playback the recording, the client application 108 may trigger the system to analyze the existing associated additional content and replace it with new, more relevant additional content to be associated with the requested DVR recording. In another embodiment, if the user stops or pauses the playback of the recording for longer periods of time, another URL may be identified and inserted or replaced taking into account the current user behavior. The new URL may point to newer, more relevant additional content that may be available. In another embodiment, when the user presses fast forward or rewind, or stops, or pauses the playback for a longer period of time etc., the URLs or links may be updated and different URLs or links may be associated with the content item based on the behavior of the user consuming the video content.

Further, as the video content item is being provided on the user's viewing device, the user behavior may be monitored and saved in the user behavior database 107 to assist in identifying, in real time or at regular intervals, newer or more relevant additional content to present to the user's viewing device 110,112,114,116.

According to an embodiment, the rendered experience may be presented according to a variety of display configurations, including scaling the being-consumed video content in a video viewer inside the provided Internet-based content or the linear video may be managed by the service provider based on the business agreements with content providers/owners, manufacturers, third party advertisers, the user, etc.

The Internet-available channel data and metadata 102, content server 104, guide data 106, and URL data 105 may be provided to a data mining engine 122 at a server 120 to analyze and sort the data and metadata, associated URL data and metadata 105, and associate the channel data and metadata 102,104, with the guide data 106. The URL data 105 may be hidden or may be displayed to the user. The associated channel/guide data may be cached. The cache 124 is illustrated in FIG. 1 as a remote element, but may be integrated with the server 120 or the client application 108. As new information becomes available, the associated channel/guide data may be updated in the cache 124.

According to one embodiment, the cached associated channel/guide data may be specific to a user profile. The system 100 may include a data services system 126 which may comprise information such as billing data, permissions and authorization data, user profile data, etc., and its data may be stored in a user database 125. The data services system 126 may be accessed by the data mining engine 122 for checking permissions, subscriptions, and profile data for associating channel and guide data to specific users.

According to an embodiment, the data mining engine 122 may also be operable to monitor the user behavior and store it in the user behavior database 107 as the user consumes the video content items and/or any additional content items. The data from the user behavior database 107 can be used to assist the system in further identifying, in real time, URLs and links with newer and more relevant additional content items that may become available, to be presented to the user, from various entities such as the consumer electronics manufacturer, content owners, content providers, third party advertisers etc.

According to another embodiment, new URLS or links may be inserted in real time based on an analysis performed in relation to the user's interactions with the additional content items on the user's viewing device and/or the user's secondary device, if it may be in use. As can be appreciated and as mentioned earlier, the URLs or links may be updated or inserted based on various factors such as the user profile, user's interactions with the additional content items, user's viewing history, time of viewing, location of the viewing device, being-consumed content business rules/agreements, etc. For example, targeting advertising links may be added to a being-consumed content item if the location of the viewing device is moved to a location associated with available targeted advertising.

As illustrated in FIG. 1, various endpoint devices may be utilized to access video content that can leverage HTML or web technologies to display video content with additional interactive content. Embodiments of the present invention may be applied to any video decoding display device that can run an associated Internet browser as part of the user interface application layer. For example, endpoint devices may include, but are not limited to, a mobile communication device 110, such as a mobile phone, a computing device 112, such as a desktop computer, a laptop computer, etc., a wireless computing device, such as a tablet computing device 114, a television 116, such as an Internet-connected television or a television connected to a network-connected device, such as a set top box (STB) 118. An endpoint device 110,112,114,116 may be utilized to access a client application 108.

The client application 108 may be operable to receive a request from a user for accessing a video content item that may or may not have associated additional content, identify additional content that may be associated based on various factors and insert a URL or link from URL data 105 with a video service that may be displayed and rendered on a TV screen (or other display device), in conjunction with the video service.

According to an embodiment, updating an already associated URL or link may also be performed based on the currently being-consumed content and analyzing the viewing patterns or other factors associated with the user. For example, a user may be viewing college football game airing on a channel provided by a service provider. A university associated with one of the teams may associate additional content related to their academic offerings, etc. to the football game content item, and links to the additional content may be added in association with the football game program. The user may have selected the associated additional content and may be accessing the additional content, such as current university course offerings, in a separate window on the same display device along with the game content item or via a website available on a separate device. There may also be other teams playing at the same time and may be airing on different channels provided by the same service provider. If the user stops the playback of a particular game and switches the channel to a next channel and associated game, while the additional content associated with the first football game video content is being presented on the user's viewing device, embodiments may allow the service provider to update the URL or links associated with the first football game video content, that may be on display on the user's viewing device, with the URLs or links associated with the second football game content item on the next channel switched to by the user.

According to yet another embodiment, when the being-consumed content item is replaced with another content item that is associated with additional content and there are additional content items associated with the previously being-consumed content item on the user's display device, then additional content for the previously being-consumed content and the currently being-consumed content may be displayed on the viewer's device such that the user may choose to continue consuming the additional content items associated with the previously being-consumed content or the additional content items associated with the currently being-consumed content.

As illustrated and described below, an indication may be provided by the client application 108 to the user in the form of an icon in a guide display or a menu option that may indicate the availability of additional content. There may also be a special button or other selectable control available on a remote control or other suitable hard or soft key selection device which may be used to request additional content based on availability. A secondary screen companion device such as a tablet with an associated content provision application may also be used to allow the request of the additional content experience on the display screen such as the television 116. Other suitable means for interacting with and controlling available and received content includes touch command, voice command, gesture command and combinations of various functionality interface methods and systems.

Figure 3A:
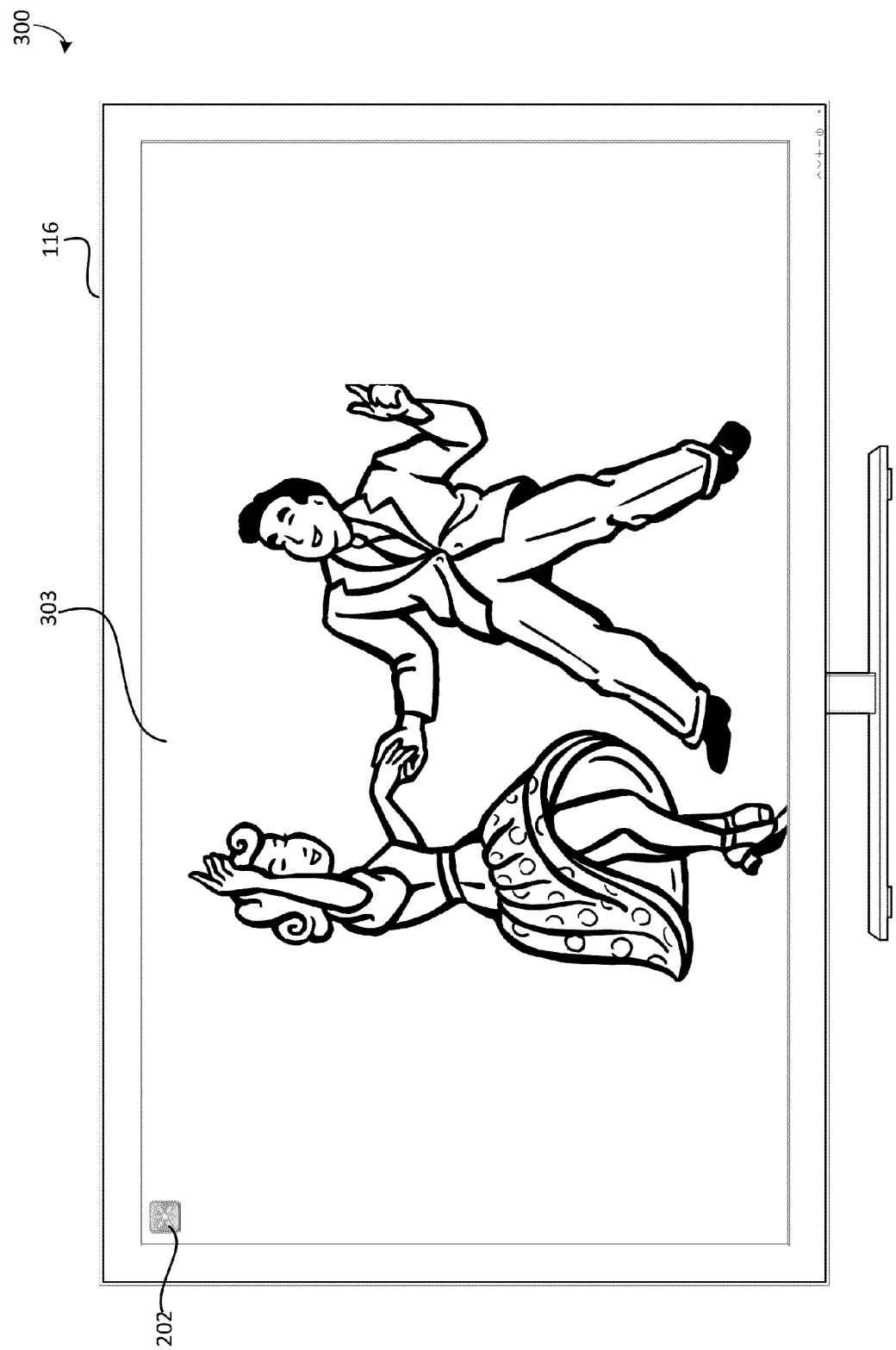
FIG. 3A is an illustration of a traditional full screen linear video, displayed on a device.
Figure 3B:
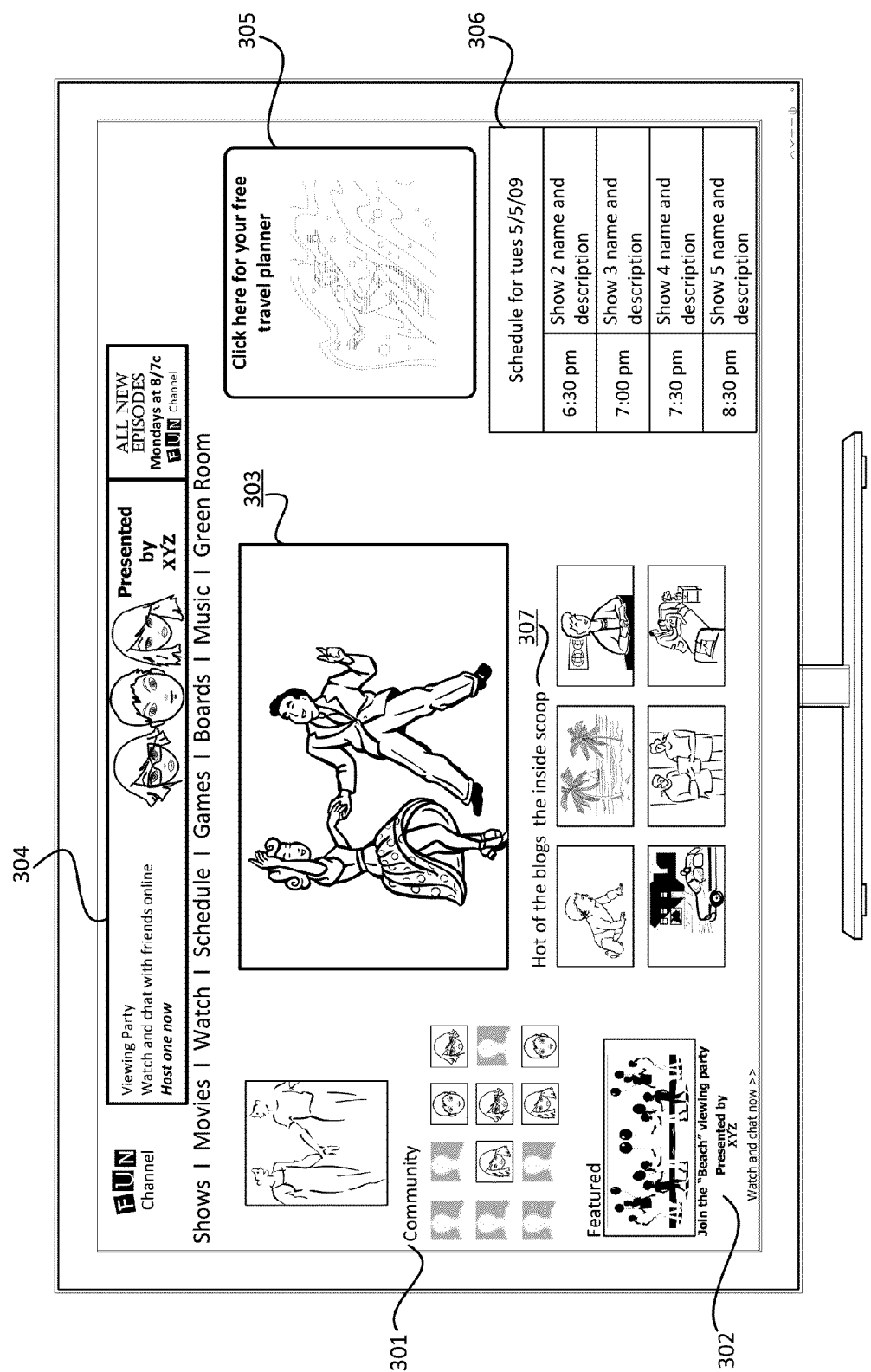
FIG. 3B is an illustration of a user interface displayed on device wherein the video content is being delivered in a hybrid fashion along with the additional content.

According to one embodiment, once the user requests access to the additional content through any one of the above mechanisms, the video content being played full screen may be overlaid or replaced by the additional content via associated website address (URL) that has been associated with the video content thus creating a web browser-type experience, as illustrated in FIG. 3B, and providing the user with more interactive, additional information and deeper and richer content from the content owner, content provider, third party sponsor or provider, etc.

The additional content may comprise updated information feeds from a social media website associated with the being-consumed video content, tailored advertisements, news items, other videos and the like that may be of interest to the user based on user preferences, third party sponsored content, and the like. The associated channel/guide data/URL data may be stored in a cache 124 located on the server 120, on the application 108, or may be located remotely and accessed via a network.

Figure 2:
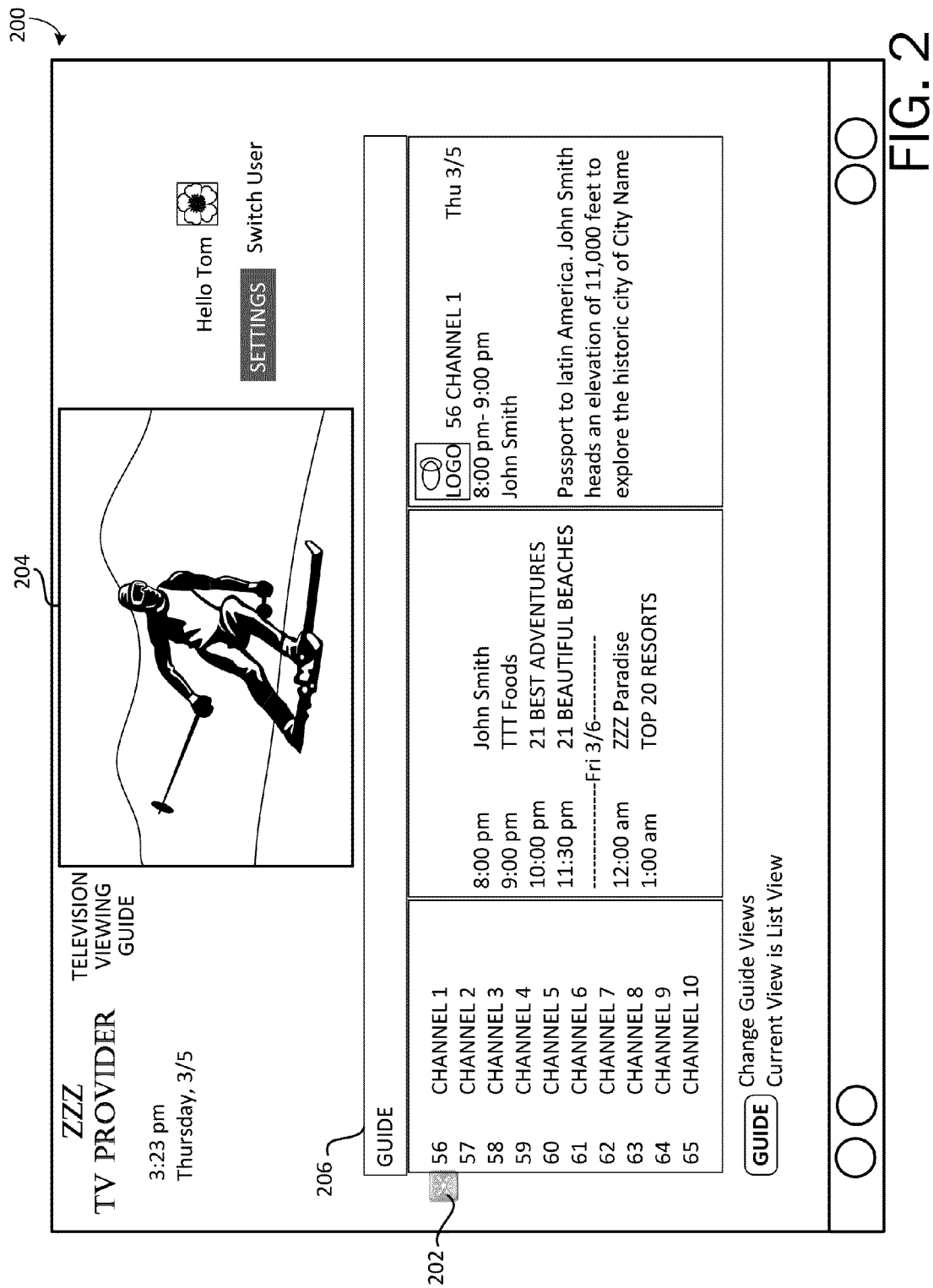
FIG. 2 is an illustration of a user interface in which may be indicated the availability of additional content.

FIG. 2 illustrates a viewing guide user interface 200 with which programming information and user interaction may be provided. According to embodiments, the interactive content provided via a given URL (described herein) may be provided via the viewing guide user interface. Referring to the viewing guide user interface 200, a guide 206 is provided wherein a listing of a variety of programming choices may be presented for user information and for user selection. A video tile 204 is provided wherein a scaled video presentation may be provided simultaneous with a display of the guide 206. Other information (not numbered) may be provided in the user interface 200, for example, advertising information, content provider logos, and the like.

According to embodiments, an indication icon 202 may be displayed in proximity to a display of the associated video content item. According to one embodiment, the icon may appear as an overlay atop the viewing guide user interface 200 for indicating the availability of interactive content in association with one or more content items provided or available via the guide interface 200. As should be appreciated, the icon 202 is for purposes of example only and is not exhaustive of the vast number of visual indicators that may be displayed to alert users of the availability of associated interactive content. For example, such an indication may be provided via a displayed banner, mosaic tile, audio alert, text string or the like. In addition, a secondary screen companion device, such as a tablet, with an application operative for passing instructions for requesting interactive content may also be used to indicate availability of interactive content and to allow the request and initiation of the interactive experience on the display screen such as the TV 116.

According to one embodiment, the icon 202 may serve as a selectable control with which a user may request and initiate provision of interactive content in association with a URL associated with a given video content item as described above. Selection of the icon 202 may cause a display in the guide 202 if Internet-based information associated with the video that will enhance the user's consumption of the video content as described herein. Alternatively, the icon 202 may be provided in association with one of the content items listed in the guide 206 for providing Internet-based information associated with the listed content item.

As should be appreciated, the icon 202 is but one example of a selectable functionality control that may be used to request information associated with a given URL. For example, a selectable control for requesting the interactive content available via an associated URL may be provided in a menu of options, or may be provided as a designated button or key on a remote control device or on a hard or soft keyboard associated with the viewing device (e.g., TV 116). In addition, an indication icon 202 may be used to alert a user of the availability of interactive content that may be requested via other means such as voice or gesture activation.

Referring to FIG. 3A, a full screen linear video display is illustrated in which video content is provided and for which a URL may be associated for providing interactive content as described herein. As with the viewing guide 200, illustrated in FIG. 2, an indicating icon 202 may be provided for indicating the availability of additional content and one or more means (as described above) may be enabled for allowing a selectable request of the associated additional content. As described above for the viewing guide 200, an indication of available content may be provided through various other means such as banners, mosaic tiles, audio alerts, text strings, or the like, or via a secondary screen companion device, such as a tablet, with an application operative for passing instructions for requesting interactive content may also be used to indicate availability of interactive content and to allow the request and initiation of the interactive experience on the display screen such as the TV 116.

Further, embodiments may provide the user with the ability to enter an interactive website mode if the user selects the additional content for consumption. For example, an advertisement may be provided in a banner form that overlays the being-consumed content item. In another example, the advertiser's website may be overlaid on top of the being-consumed content item. Once the user is finished accessing the additional content, the user may switch back to viewing the original being-consumed content item. As can be appreciated, in case of nonlinear content, when the user switches back to the original being-consumed content item, the system may be able to continue from the same point the user switched from the original being-consumed content item to the additional interactive content item. Whereas, in case of a linear content item, the user may be taken to the current point that may be streaming at that point of time.

Referring now to FIG. 3B, after requesting additional content associated with a URL inserted in or associated with a video content item, as described above, a hybrid interactive video experience may be provided. This experience is a result of downloading the associated URL with the hybrid web experience to the video display device. As can be appreciated, the additional content may be displayed in a variety of different ways per the discretion of the content owner, content provider, etc. For example, upon choosing to experience a given additional content associated with the full screen video playing as illustrated in FIG. 3A, the hybrid display of linear video combined with the additional content may be presented to user as illustrated in FIG. 3B. The hybrid video viewing experience may include a blend of traditional video content with personalized additional content from service providers, content providers and/or content owners, such as broadcasters, online providers and manufacturers including digital video recording (DVR) providers, video-on-demand (VOD) providers, interactive advertising and content personalization providers, voting system providers, games and social networking, as well as, a variety of video programming-related content and services.

As should be appreciated, the hybrid interactive video experience, illustrated in FIG. 3B is for purposes of example and is not exhaustive of the vast number of layouts that may be provided. That is, the display screen may be presented as an instance of a browser-type display where a variety of content items available via the associated URL may be displayed in various locations and where the video content item 303 from which the user requested the additional interactive content may be presented in a minimized embedded player with other additional content wrapped around it. Alternatively, each additional content item may be presented in one or more mosaic-type tiles that may be disposed on a display screen while a display of the linear video is reduced accordingly. Alternatively, the hybrid content illustrated in FIG. 3B may be provided via a browser within a browser setup (one with the video content and another with the additional content).

The additional content provided via the URL may comprise any number of Internet-based content items, for example, a social media website 301 for an associated television show with real-time feeds, cast profiles, messaging, etc. Other content items may include featured upcoming event information 302, various other sponsored shows previews 307, program guides 306, third party advertisements 305 (based on the user profiles and tastes, third party sponsorships, etc.), as well as, other advertisements 304 or other useful or helpful information. All of the additional content illustrated in FIG. 3B may be navigable based on predetermined business rules of content providers.

According to an embodiment, the associated URL may be automatically updated based on time of day, user behavior, and available content or based on action from a user, service provider, content creator, content provider, third party content provider or sponsor based on business rules and agreements, or the like. Further, the URL may also be updated based on business agreements in order to display an advertisement or other content based on a scene being shown as part of the video.

The video content items and additional content items may be provided in a variety of display configurations. Following from the above example, an example news and entertainment content provider may choose to scale their video and place it in the top left corner of a display surface, align their news stories along the right side, and align their video clips along the bottom. The user may, through a functionality control interface, select a companion video clip, text-based news item, or other content item within an interactive environment that while the user is tuned to the television channel associated with the being-consumed video content.

Further, embodiments may allow the user to access the additional content based on the user's needs. For example, user may be able watch the additional content in a video pane and choose to hear the additional content by selecting the video pane or choose to hear the being-consumed video content.

Figure 4:
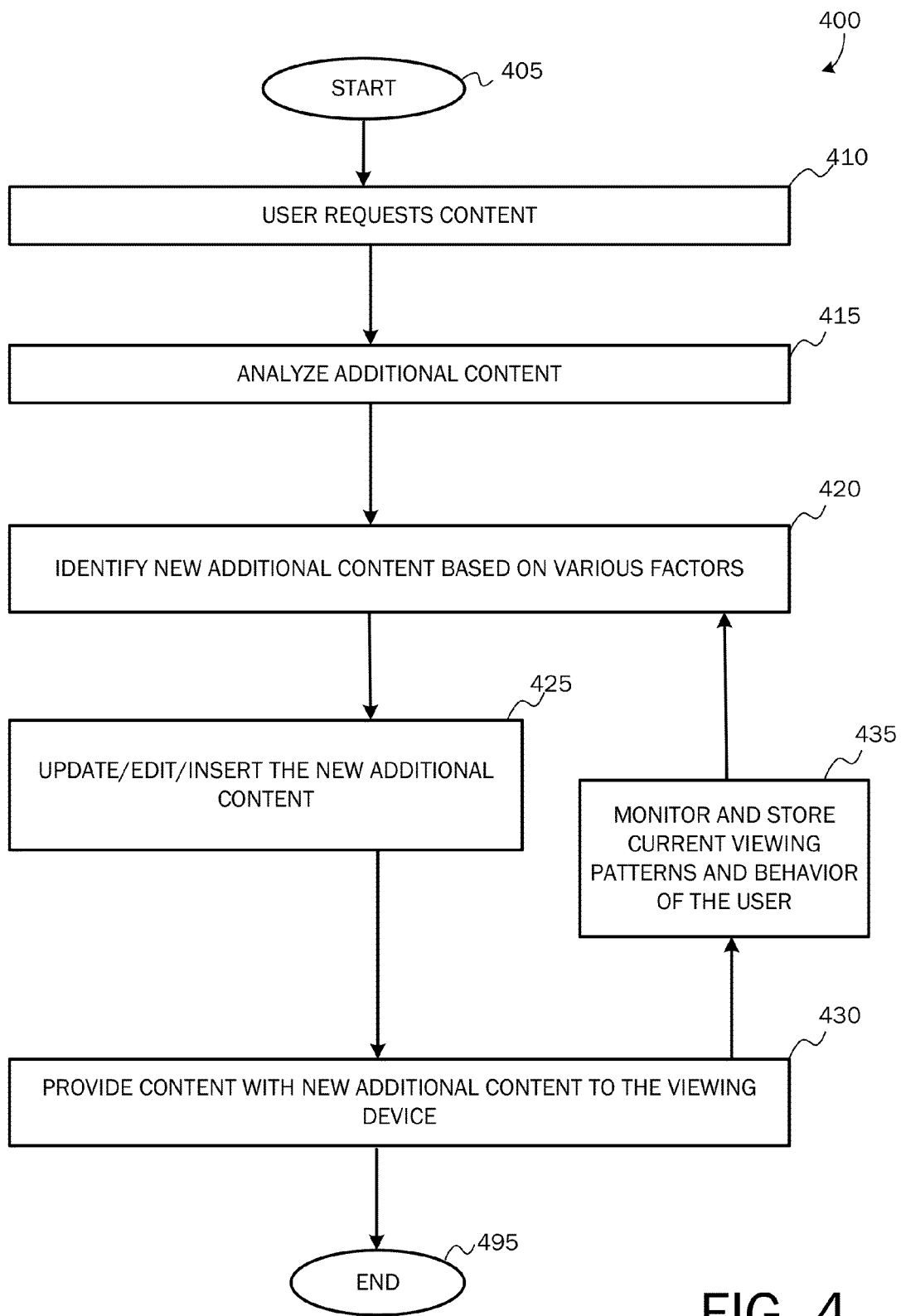
FIG. 4 is a flow chart of a method for providing editing and changing of links associated with being-consumed content in real time.

FIG. 4 is a flow chart of a method for providing editing and changing of links associated with being-consumed content in real time. The method 400 begins at OPERATION 405 and proceeds to OPERATION 410 where a user may request to view a video content item. The method 400 proceeds to OPERATION 415 to perform an analysis of additional content relating to the requested video content item.

The method 400, then proceeds to OPERATION 420, where new additional content may be identified that may be provided to the user's viewing device. In one embodiment, the new additional content may include recently available content, content relevant to the user, content relevant to location of the requesting device, content relating to time of viewing, etc.

Once the additional content item(s) are identified at OPERATION 420, the method 400 proceeds to OPERATION 425 where the system updates, edits and/or inserts links or URLs to the new additional content. For example, the links (e.g., URLs) pointing to the new additional content may be inserted into the content stream, metadata, etc. As another example, the links (e.g., URLs) pointing to the new additional content may comprise time stamps and may be sent separately from the video stream. The URLs may be synchronized with the video stream via the time stamps. If the content is already associated with additional content, the previously associated links (e.g., URLs) may be replaced or updated by new links (e.g., URLs), which may provide the newly identified additional content to the viewing device that is personalized for the user.

The method 400 then proceeds to OPERATION 430 where the requested video content item with added or updated additional content may be rendered on the user's viewing device by the client application 108.

Further, as the video content item with links to additional content is being provided on the user's viewing device, the user behavior on how he/she may be consuming the video content item or the additional content may be monitored and saved in the user behavior database 107, at OPERATION 435, to assist in performing an ongoing analysis, either in real time or at regular intervals, to identify if there may be newer or more relevant additional content that may be available at OPERATION 420 to be presented to the user's viewing device.

Figure 5:
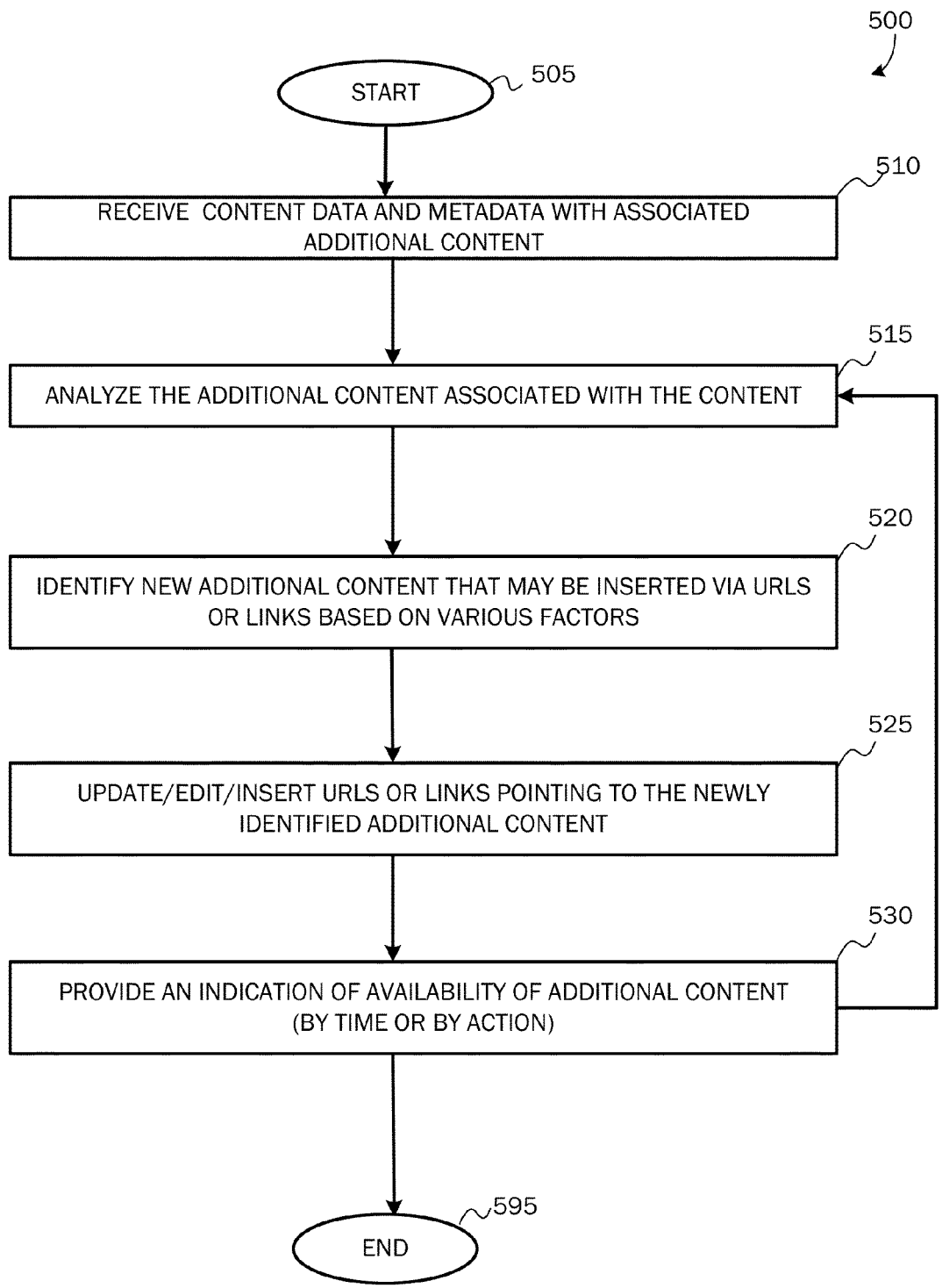
FIG. 5 is a flow chart of a method for providing editing and changing of links associated with being-consumed content in real time.

FIG. 5 is a flow chart of a method for providing editing and changing of links associated with being-consumed content in real time. The method 500 begins at OPERATION 505 and proceeds to OPERATION 510 where content data and metadata with associated additional content is received. For example, in one embodiment, Internet-available channel data and metadata 102, content data (via content server 104), guide data 106, and URL data 105 are received. As described above, the data and metadata 102,104,105,106 may include data and metadata about programming available via the Internet and linear programming and may include such information as information about available programs including URLs for the additional content, program titles, storylines, cast information, genres, ratings, release dates, images, etc.

The received channel data and metadata 102,104,105 may then be analyzed at OPERATION 515. At OPERATION 520, new additional content that may be provided to the user's viewing device which may have either become available recently, or may be relevant to the user due to location of the requesting device, time of viewing, etc., may be identified.

It may be noted that when the content data and metadata are received at OPERATION 510, they may include additional interactive content that may associated to the video content by the content owners/providers. The URLs or links pointing to the additional content may be static and generic for all users. According to embodiments, the service provider may have user's viewing pattern data, user subscription and entitlements data, user demographic profile data etc. which may allow the service provider to provide the user with more personalized additional content. This may be in the best interest of the user, the service provider, the content provider/ owner and other related parties such as third party advertisers etc.

Once the URLS or links pointing to the new additional content are identified at OPERATION 520, the method 500 may proceed to OPERATION 525, where any currently associated links may be replaced or updated by new links. It may be noted that some video content items that are received at OPERATION 510 may not contain any associated additional content. Accordingly, the links may be inserted. The new links may be sorted and associated with the guide data 106 by the data mining engine 122.

According to an embodiment, at OPERATION 525, a generic link may also be added in association with the video content item through various mechanisms. The generic link may then be mapped to various additional content items that may be updated dynamically as new additional content becomes available. The generic link may also be triggered to point to other additional content that may be identified as relevant content. The relevancy of the additional content may be based on various factors related to the user, which allows the system to provide targeted content to the user.

The method 500 then proceeds to OPERATION 530 where an indication of availability of additional content may be provided via an indicative icon 202 through the guide user interface 200 as illustrated earlier with respect to FIG. 2, or an indication may be provided on the user's viewing device, as the user may be viewing the video content item 303 as illustrated in FIG. 3A.

The method 500 ends at OPERATION 595.

Figure 6:
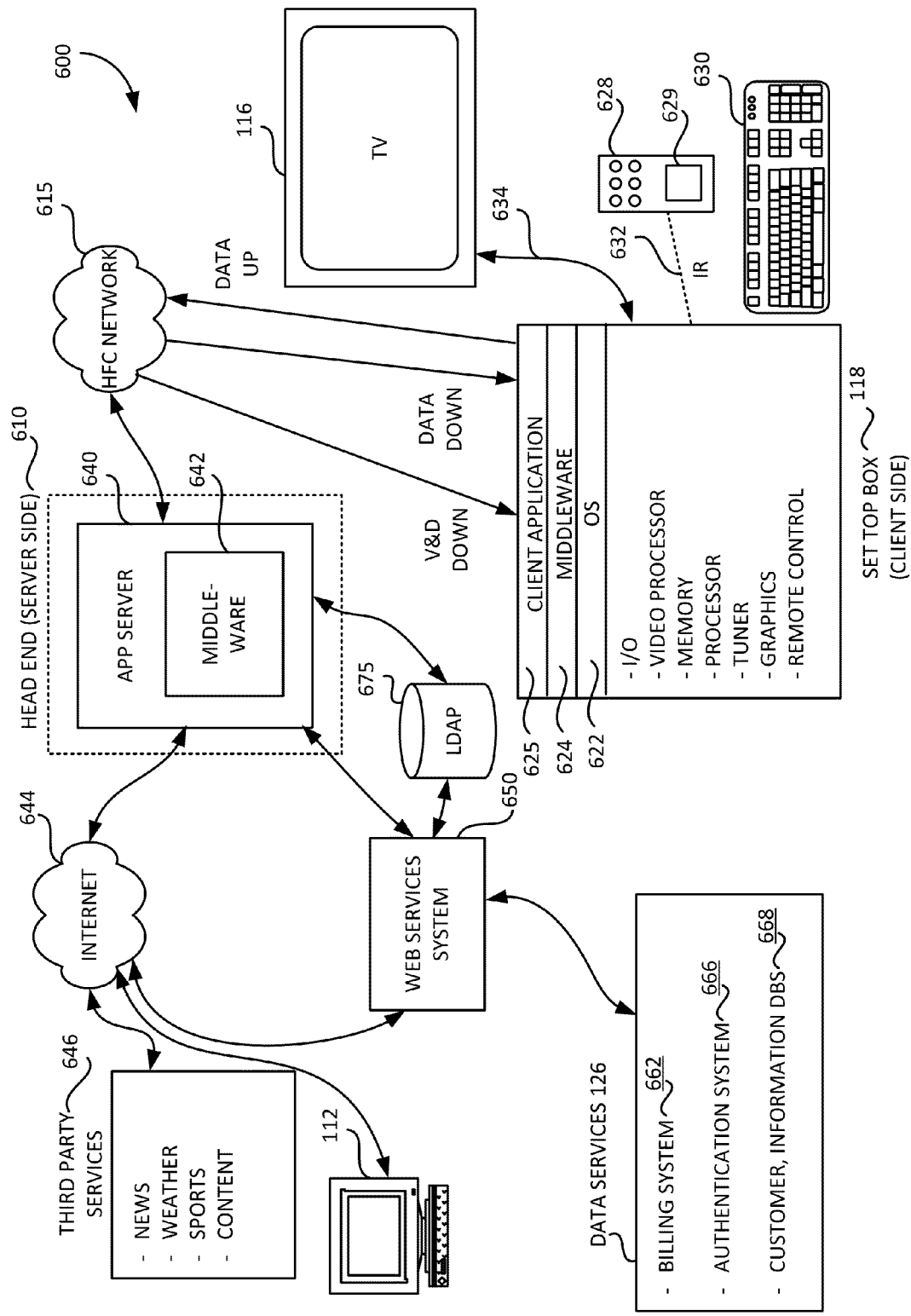
FIG. 6 is a block diagram illustrating a cable television services system architecture providing an operating environment according to an embodiment.

FIG. 6 is a block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for providing editing and changing of links of programs in real time. Referring now to FIG. 6, digital and analog video programming, information content and interactive television services are provided via a hybrid fiber coax (HFC) network 615 to a television set 116 for consumption by a cable television/ services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the client-side set-top box 118 and the server-side application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a client-side set-top box (STB) 118 functionally connected to a customer receiving device, such as the television set 116. As is understood by those skilled in the art, modern CATV systems 600 may provide a variety of services across the HFC network 615 including traditional digital and analog video programming, telephone services, high speed Internet access, video-on-demand, and information services.

On the client side of the CATV system 600, digital and analog video programming and digital and analog data are provided to the customer television set 116 via the set-top box (STB) 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628, keyboard 630, or other computing device 112, such as a tablet/slate computer 114, smart phone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television set 116 via a cable communication transport 634. A multi-channel tuner is provided for processing video and data to and from the STB 118 and the server-side head end system 610, described below.

The STB 118 also includes an operating system 622 for directing the functions of the STB 118 in conjunction with a variety of client applications 625. For example, if a client application 625 requires a news flash from a third-party news source to be displayed on the television 116, the operating system 622 may cause the graphics functionality and video processor of the STB 118, for example, to output the news flash to the television 116 at the direction of the client application 625 responsible for displaying news items.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications 625 and operating systems 622 that allow the client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the set-top box 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data from the client side of the CATV system 600 to the server side of the CATV system 600 via the HFC network 615 via one data uplink. The video/ data downlink is an "in band" downlink that allows for digital and analog video and data signaling from the server side of the CATV system 600 through the HFC network 615 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 6, between the HFC network 615 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 640 is typically passed through the "out of band" data links. Alternatively, an "in band" data carousel may be positioned in an "in band" channel into which a data feed may be processed from the server-side application server 640 through the HFC network 615 to the client-side STB 118. Operation of data transport between components of the CATV system 600, described with reference to FIG. 6, is well known to those skilled in the art.

Referring still to FIG. 6, the head end 610 of the CATV system 600 is positioned on the server side of the CATV system and includes hardware and software systems responsible for originating and managing content for distributing through the HFC network 615 to client-side STBs 118 for presentation to customers via televisions 116. As described above, a number of services may be provided by the CATV system 600, including digital and analog video programming, interactive television services, telephone services, video-on-demand services, targeted advertising, and provision of information content.

The application server 640 is a general-purpose computing system operative to assemble and manage data sent to and received from the client-side set-top box 118 via the HFC network 615. As described above with reference to the set-top box 118, the application server 640 includes a middleware layer 642 for processing and preparing data from the head end of the CATV system 600 for receipt and use by the client-side set-top box 118. For example, the application server 640 via the middleware layer 642 may obtain data from third-party services 646 via the Internet 644 for transmitting to a customer through the HFC network 615 and the set-top box 118. For example, content metadata a third-party content provider service may be downloaded by the application server via the Internet 644. When the application server 640 receives the downloaded content metadata, the middleware layer 642 may be utilized to format the content metadata for receipt and use by the set-top box 118. Therefore, content metadata may be sent and categorized based on the availability to the customer's program guide data.

According to one embodiment, data obtained and managed by the middleware layer 642 of the application server 640 is formatted according to the Extensible Markup Language and is passed to the set-top box 118 through the HFC network 615 where the XML-formatted data may be utilized by a client application 625 in concert with the middleware layer 624, as described above. As should be appreciated by those skilled in the art, a variety of third-party services data, including news data, weather data, sports data and other information content may be obtained by the application server 640 via distributed computing environments such as the Internet 644 for provision to customers via the HFC network 615 and the set-top box 118. According to embodiments, client application 640 may include the client application 108 described herein.

According to embodiments, the application server 640 obtains customer support services data, including billing data, information on customer work order status, answers to frequently asked questions, services provider contact information, and the like from data services 126 for provision to the customer via an interactive television session. As illustrated in FIG. 6, the services provider data services 126 include a number of services operated by the services provider of the CATV system 600 which may include data on a given customer.

A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

A customer information database 668 may include general information about customers such as place of employment, business address, business telephone number, and demographic information such as age, gender, educational level, and the like. The customer information database 668 may also include information on pending work orders for services or products ordered by the customer. The customer information database 668 may also include general customer information such as answers to frequently asked customer questions and contact information for various service provider offices/departments. As should be understood, this information may be stored in a variety of disparate databases operated by the cable services provider.

Referring still to FIG. 6, web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by a set-top box identification associated with the customer. The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above.

An authentication system 666 may include information such as secure user names, subscriber profiles, subscriber IDs, and passwords utilized by customers for access to network services. As should be understood by those skilled in the art, the disparate systems 650, 662, 666, 668 may be integrated or provided in any combination of separate systems, wherein FIG. 6 shows only one example.

Figure 7:
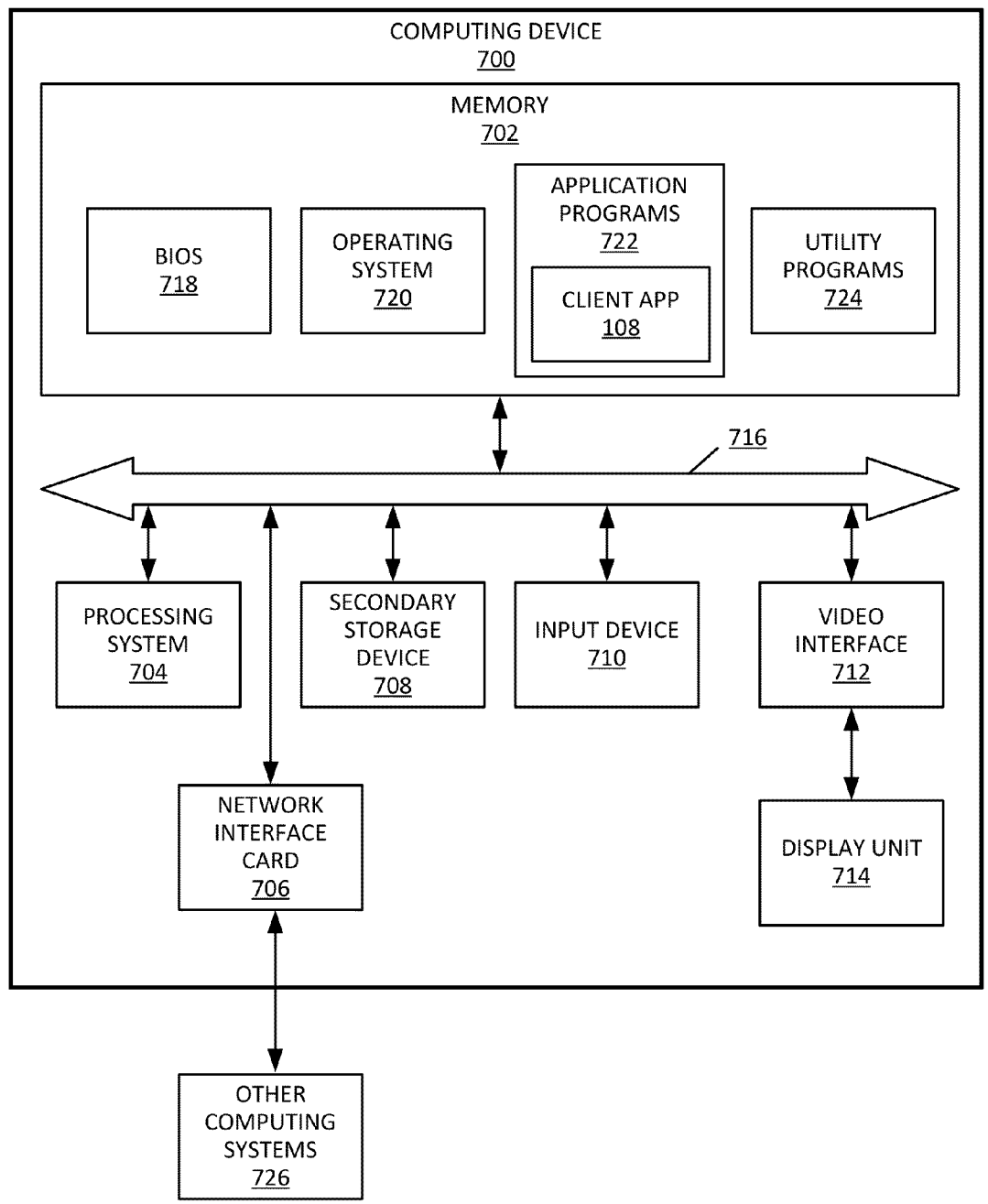
FIG. 7 is a block diagram illustrating example physical components of a computing device with which embodiments may be practiced.

FIG. 7 is a block diagram illustrating example physical components of a computing device 700 with which embodiments may be practiced. In some embodiments, one or a combination of the components 108,110,112,114,116,118, 120,122,124,126 of system 100 may be implemented using one or more computing devices like the computing device 700. It should be appreciated that in other embodiments, components 108, 110, 112, 114, 116, 118, 120, 122, 124, 126 of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, the client application 108 may be stored locally on computing device 700. Memory 702 thus may store the computer-executable instructions that, when executed by processor 704, cause the client application 108 to allow users to jump to desired channels by entering a request based information such as channel name, logo, call letter, or programs as described above with reference to FIGS. 1-6.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the client application 108. The memory 702 also stores one or more utility programs 724 that, when executed by the processing system 704, cause the computing device 700 to provide utilities to other software programs.

Embodiments of the present invention may be utilized in various distributed computing environments where tasks are performed by remote processing devices that are linked through a communications network in a distributed computing environment.

Figures 8A, 8B:
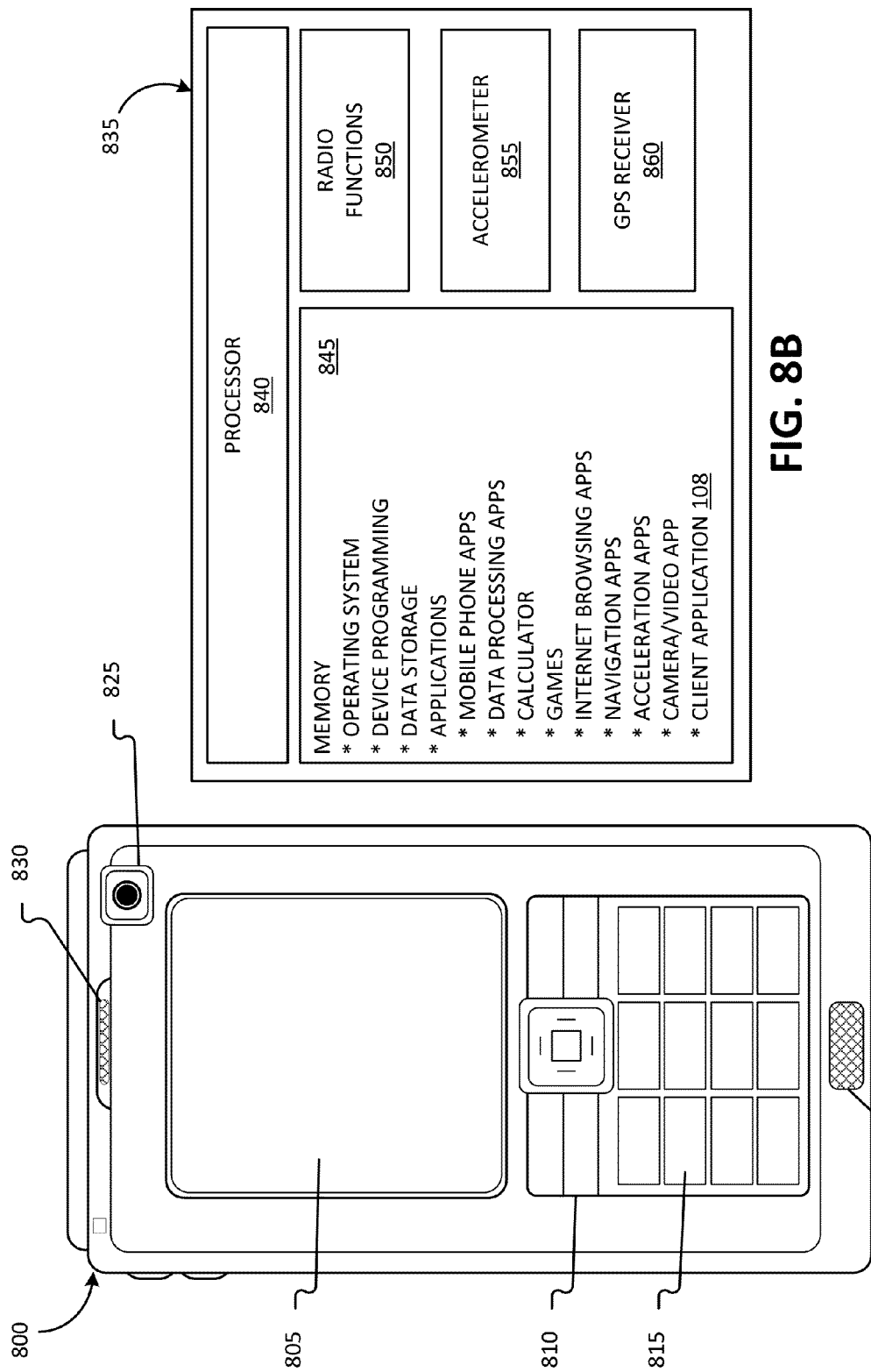
FIGS. 8A and 8B illustrate a suitable mobile computing environment with which embodiments may be practiced.

FIGS. 8A-B illustrate a suitable mobile computing environment, for example, a mobile computing device 110, a smart phone, a tablet personal computer 114, a laptop computer 112, and the like, with which embodiments may be practiced. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the mobile computing device, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client application 108 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device's 800 location.

Although described herein in combination with mobile computing device 800, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for providing additional content in association with a video content item, the method comprising:
   receiving a video stream comprising a video content item and metadata;
   identifying an additional content item to be associated with the video content item;
   associating a link to the additional content item with the video content item;
   receiving a selection to access the additional content item;
   analyzing the video content item to determine whether to update the link to the additional content item according to one or more factors;
   updating the link to the additional content item by modifying a uniform resource locator associated with the additional content item;
   analyzing the video content item to determine whether to associate a new link to a new additional content item according to the one or more factors;
   associating the new link to the new additional content item by associating a new uniform resource locator to the new additional content item corresponding to the video content item;
   providing the additional content item and the new additional content item; and enabling access to the additional content item and the new additional content item via the link and the new link from a viewing guide.

2. The method of claim 1, further comprising associating the new link to the new additional content item identified as being more relevant than the identified additional content item.

3. The method of claim 1, further comprising indicating availability of the additional content item as part of a display of a viewing guide.

4. The method of claim 3, wherein indicating availability of the additional content item comprises providing a selectable indication icon in proximity of a display of the video content item.

5. The method of claim 1, wherein identifying the additional content item is performed in real time, at regular intervals, or upon receiving a selection for retrieving the additional content item.

6. The method of claim 1, wherein identifying the additional content item to be associated with the video content item comprises analyzing the video content item based on user behavior.

7. The method of claim 6, wherein the user behavior includes one or more user actions such playing, rewinding, pausing, stopping, and hovering with respect to the video content item.

8. The method of claim 1, wherein identifying the additional content item to be associated with the video content item is based on:
 a user's behavior;
 a user's profile;
 a user's viewing history;
 a user's social networks;
 a time of the day;
 a location of the viewing device; and
 the content being viewed.

9. The method of claim 1, wherein providing the additional content item comprises displaying the additional content item in a format optimized for a viewing device on which the additional content item is to be displayed.

10. The method of claim 9, wherein displaying the additional content item in a format optimized for a viewing device on which the additional content item is to be displayed comprises displaying a website with the additional content item integrated therein.

11. The method of claim 9, wherein displaying the additional content item in a format optimized for a viewing device on which the additional content item is to be displayed comprises displaying the additional content item on a device with browser capabilities.

12. A system for providing additional interactive content in association with a video content item, the system comprising:
 a memory storage; and
 a processing unit coupled to the memory storage, wherein the processing unit is operable to:
 receive a video stream comprising a video content item and metadata;
 identify an additional interactive content item to be associated with the video content item;
 associate a link to the additional interactive content item with the video content item;
 indicate availability of the additional interactive content item;
 receive a selection to access the additional interactive content item;
 analyze the video content item to determine whether to update the link to the additional content item according to one or more factors;
 update the link to the additional content item by modifying a uniform resource locator associated with the additional content item;
 analyze the video content item to determine whether to associate a new link to a new additional content item according to the one or more factors;
 associate the new link to the new additional content item by associating a new uniform resource locator to the new additional content item corresponding to the video content item;
 provide the additional interactive content item and the new additional content item; and
 enable access to the additional content item and the new additional content item via the link and the new link from a viewing guide.

13. The system of claim 12, wherein the processing unit is further operable to associate the new link to the new additional content item in response to receiving an indication of a change in the video content.

14. The system of claim 12, wherein the processing unit is further operable to associate the new link to the new additional content item identified as being more relevant than the additional interactive content item.

15. The system of claim 12, wherein the processing unit is further operable to identify the additional interactive content item in real time, at regular intervals, or when a trigger is received.

16. A non-transitory computer readable storage medium containing computer executable instructions which when executed by a computer perform a method for providing additional interactive content, comprising:
 receiving a video stream comprising a video content item and metadata;
 identifying an additional interactive content item to be associated with the video content item based on user behavior;
 associating a link to the additional content item with the video content item;
 indicating availability of the additional interactive content item including providing a selectable indication icon in proximity of a display of the video content item for receiving a selection to access the additional interactive content item;
 receiving a selection to access the additional interactive content item;
 analyzing the video content item to determine whether to update the link to the additional content item according to one or more factors;
 updating the link to the additional content item by modifying a uniform resource locator associated with the additional content item;
 analyzing the video content item to determine whether to associate a new link to a new additional content item according to the one or more factors;
 associating the new link to the new additional content item by associating a new uniform resource locator to the new additional content item corresponding to the video content item;
 providing the additional interactive content item and the new additional content item; and
 enabling access to the additional content item and the new additional content item via the link and the new link from a viewing guide.

17. The computer readable storage medium of claim 16, further comprising associating the new link to the new additional content item in response to receiving an indication of a change in the video content, wherein associating the new link to the new additional content item comprises:
- inserting the new link in the metadata associated with the video content item; or
- sending the new link separately from the video content item and synchronizing the new link to the video content item with time stamps.

18. The computer readable storage medium of claim 16, further comprising associating the new link to the new additional content item identified as being more relevant than the additional content item.

19. The computer readable storage medium of claim 16, wherein providing the additional content item comprises displaying the additional content item in a format optimized for a viewing device on which the additional content item is to be displayed and further comprises displaying a website with the video content item integrated therein.

\* \* \* \* \*